United States Patent
Kim et al.

(10) Patent No.: US 9,325,472 B2
(45) Date of Patent: Apr. 26, 2016

(54) METHOD AND APPARATUS FOR SIGNAL TRANSCEIVING IN WIRELESS COMMUNICATION SYSTEM

(75) Inventors: Hakseong Kim, Anyang-si (KR); Hanbyul Seo, Anyang-si (KR); Kijun Kim, Anyang-si (KR); Inkwon Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 118 days.

(21) Appl. No.: 14/127,899

(22) PCT Filed: Jul. 20, 2012

(86) PCT No.: PCT/KR2012/005817
§ 371 (c)(1),
(2), (4) Date: Dec. 19, 2013

(87) PCT Pub. No.: WO2013/012284
PCT Pub. Date: Jan. 24, 2013

(65) Prior Publication Data
US 2014/0133425 A1    May 15, 2014

Related U.S. Application Data

(60) Provisional application No. 61/510,471, filed on Jul. 21, 2011, provisional application No. 61/512,384, filed on Jul. 27, 2011.

(51) Int. Cl.
*H04L 5/00* (2006.01)
*H04B 7/02* (2006.01)
*H04J 11/00* (2006.01)
*H04L 27/26* (2006.01)

(52) U.S. Cl.
CPC .............. *H04L 5/0053* (2013.01); *H04B 7/024* (2013.01); *H04J 11/0093* (2013.01); *H04L 5/0035* (2013.01); *H04L 27/2676* (2013.01)

(58) Field of Classification Search
CPC . H04B 7/024; H04J 11/0093; H04L 27/2676; H04L 5/0035; H04L 5/0053
USPC ........................................ 370/310, 328, 329
See application file for complete search history.

(56) References Cited

U.S. PATENT DOCUMENTS

2010/0027456 A1*  2/2010  Onggosanusi et al. ....... 370/312
2010/0254329 A1* 10/2010  Pan et al. ...................... 370/329

(Continued)

FOREIGN PATENT DOCUMENTS

KR   10-2009-0083269 A    8/2009
WO   WO 2010/129606 A1   11/2010

(Continued)

*Primary Examiner* — Chi H Pham
*Assistant Examiner* — Robert Lopata
(74) *Attorney, Agent, or Firm* — Birch, Stewart, Kolasch & Birch, LLP

(57) ABSTRACT

An embodiment of the present invention is a method for receiving a signal from a plurality of transmission points in a wireless communication system, the method for receiving a signal comprising the steps of: blind decoding a first search space of a subframe received from a first transmission point; and blind decoding a second search space of a subframe received from a second transmission point, wherein the combination of the first search space and the second search space is equivalent to a search space that results when a signal is received from only one transmission point from among the plurality of transmission points.

14 Claims, 16 Drawing Sheets

(56) References Cited

U.S. PATENT DOCUMENTS

| | | | |
|---|---|---|---|
| 2010/0290418 A1* | 11/2010 | Nishio et al. | 370/329 |
| 2011/0269492 A1* | 11/2011 | Wang | 455/509 |
| 2012/0063349 A1 | 3/2012 | Kim et al. | |
| 2012/0250641 A1* | 10/2012 | Sartori et al. | 370/329 |
| 2012/0257552 A1* | 10/2012 | Chen et al. | 370/280 |
| 2013/0022014 A1* | 1/2013 | Hong et al. | 370/329 |
| 2013/0028219 A1* | 1/2013 | Lee et al. | 370/329 |
| 2013/0114529 A1* | 5/2013 | Chen et al. | 370/329 |
| 2013/0153298 A1* | 6/2013 | Pietraski et al. | 175/45 |
| 2014/0133427 A1* | 5/2014 | Kim et al. | 370/329 |
| 2014/0161056 A1* | 6/2014 | Moulsley et al. | 370/329 |

FOREIGN PATENT DOCUMENTS

| | | |
|---|---|---|
| WO | WO 2010/131928 A2 | 11/2010 |
| WO | WO 2011/019962 A2 | 2/2011 |

\* cited by examiner

FIG. 5
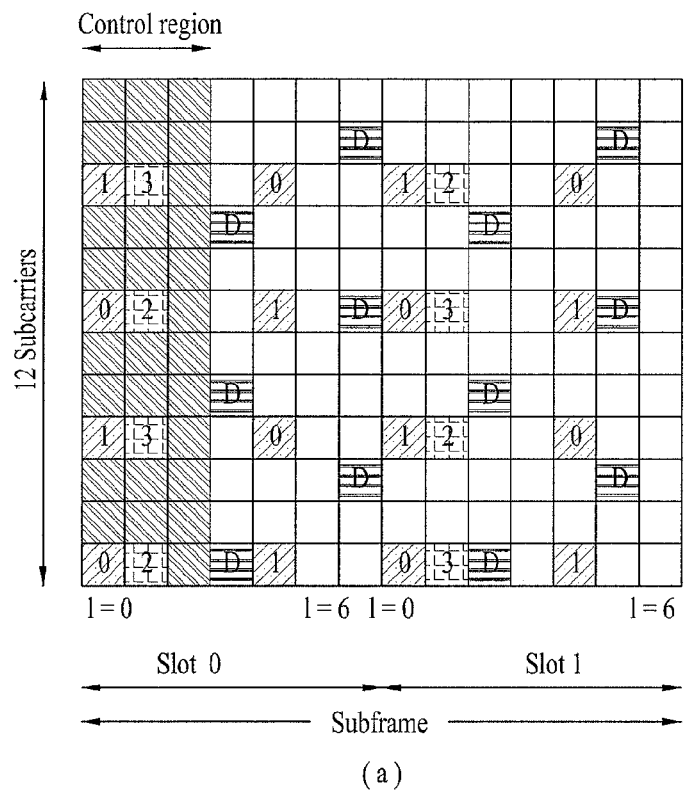
(a)
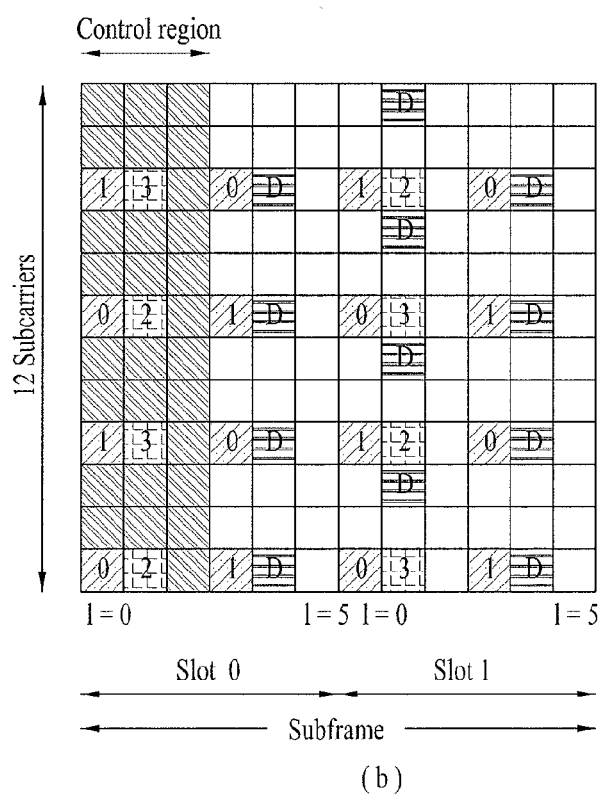
(b)

METHOD AND APPARATUS FOR SIGNAL TRANSCEIVING IN WIRELESS COMMUNICATION SYSTEM

CROSS REFERENCE TO RELATED APPLICATIONS

This application is the National Phase of PCT/KR2012/005817 filed on Jul. 20, 2012, which claims priority under 35 U.S.C. 119(e) to U.S. Provisional Application No. 61/510,471 filed on Jul. 21, 2011 and to U.S. Provisional Application No. 61/512,384 filed on Jul. 27, 2011, all of which are incorporated by reference herein in its entirety.

TECHNICAL FIELD

The following description relates to a method and apparatus for transmitting and receiving a signal in a wireless communication system.

BACKGROUND ART

Wireless communication systems have been diversified in order to provide various types of communication services such as voice or data service. In general, a wireless communication system is a multiple access system capable of sharing available system resources (bandwidth, transmit power or the like) so as to support communication with multiple users. Examples of the multiple access system include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system a Multi Carrier Frequency Division Multiple Access (MC-FDMA) system and the like.

DISCLOSURE

Technical Problem

An object of the present invention devised to solve the problem lies in a method and apparatus for transmitting and receiving a signal in a wireless communication system, and, more particularly, dynamic change of a transmission point of a physical downlink control channel and search space partitioning.

The technical problems solved by the present invention are not limited to the above technical problems and other technical problems which are not described herein will become apparent to those skilled in the art from the following description.

Technical Solution

The object of the present invention can be achieved by providing a method of, at a user equipment (UE), receiving a signal from a plurality of transmission points in a wireless communication system, including performing blind decoding with respect to a first search space of a subframe received from a first transmission point and performing blind decoding with respect to a second search space of a subframe received from a second transmission point, wherein a combination of the first search space and the second search space corresponds to a search space when a signal is received from only any one of the plurality of transmission points.

In another aspect of the present invention, provided herein is a method of transmitting a signal at a first transmission point among a plurality of transmission points in a wireless communication system, including transmitting a subframe including a first search space, which corresponds to a subframe including a second search space transmitted by a second transmission point, wherein a combination of the first search space and the second search space corresponds to a search space when a signal is received from only any one of the plurality of transmission points.

In another aspect of the present invention, provided herein is a user equipment (UE) apparatus for receiving a signal from a plurality of transmission points in a wireless communication system, including a reception module and a processor, wherein the processor performs blind decoding with respect to a first search space of a subframe received from a first transmission point and a second search space of a subframe received from a second transmission point, and a combination of the first search space and the second search space corresponds to a search space when a signal is received from only any one of the plurality of transmission points.

In another aspect of the present invention, provided herein is an apparatus of a first transmission point among a plurality of transmission points in a wireless communication system, including a transmission module and a processor, wherein the processor transmits a subframe including a first search space, which corresponds to a subframe including a second search space transmitted by a second transmission point, and a combination of the first search space and the second search space corresponds to a search space when a signal is received from only any one of the plurality of transmission points.

The aspects of the present invention may include the following features.

The first search space may be for downlink control information (DCI) for a plurality of UEs including the UE and the second search space may be DCI for the UE.

The first search space may be for a DCI format which does not depend on a transmission mode and the second search space may be for a DCI format which depends on a transmission mode.

The first search space and the second search space may not overlap in terms of an aggregate of control channel elements which is a blind decoding unit.

The number of physical downlink control channel (PDCCH) candidates included in the first search space may be equal to the number of PDCCH candidates included in the second search space.

The first search space and the second search space may be different in terms of the number of times of blind decoding.

The first search space and the second search space may be located in a control region indicated by a physical control format indicator channel (PCFICH).

The first search space may be located in a control region indicated by a physical control format indicator channel (PCFICH) and the second search space may be located in a data region excluding the control region.

The second search space may be indicated by downlink control information (DCI) acquired from the first search space.

The first transmission point and the second transmission point may be determined by information fed back by the UE.

The method may further include transmitting channel state information of the first transmission point and channel state information of the second transmission point in channel state information of the plurality of transmission points.

Advantageous Effects

According to the present invention, it is possible to adaptively determine a transmission point of a physical downlink control channel according to a channel state. In addition, by partitioning a search space, it is possible to efficiently transmit a control signal. In addition, it is possible to accurately acquire transmission synchronization between data and a reserved signal transmitted for securing resources on an unlicensed band.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention. In the drawings:

FIG. 5 is a diagram illustrating a downlink reference signal;

BEST MODE

Figure 1:
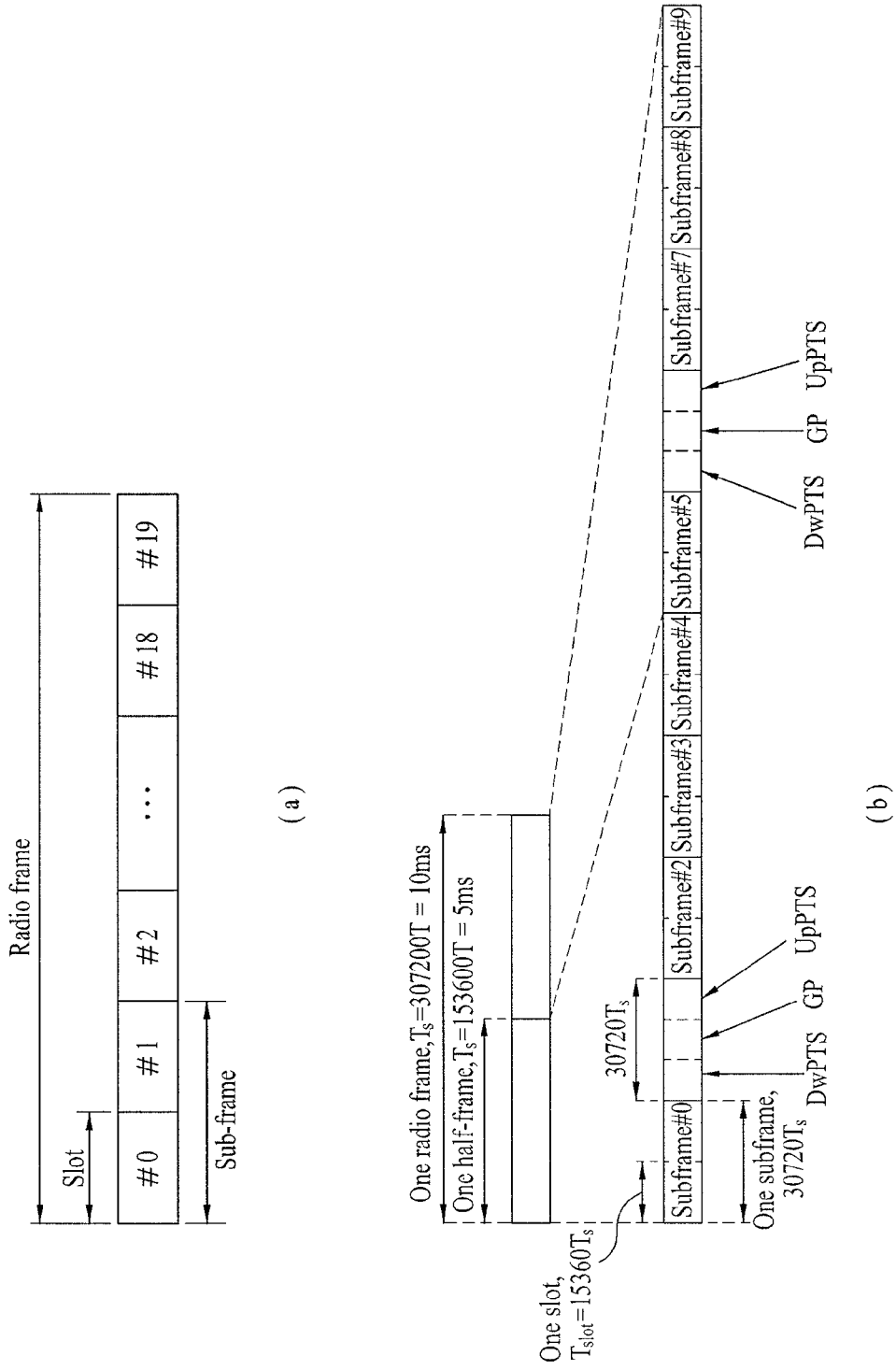
FIG. 1 is a diagram showing the structure of a radio frame.

The following embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed to others. Some components or characteristics of any embodiment may also be included in other embodiments, or may be replaced with those of the other embodiments as necessary.

The embodiments of the present invention are disclosed on the basis of a data communication relationship between a base station and a terminal. In this case, the base station is used as a terminal node of a network via which the base station can directly communicate with the terminal. Specific operations to be conducted by the base station in the present invention may also be conducted by an upper node of the base station as necessary.

In other words, it will be obvious to those skilled in the art that various operations for enabling the base station to communicate with the mobile station in a network composed of several network nodes including the base station will be conducted by the base station or network nodes other than the base station. The term base station (BS) may be replaced with the terms fixed station, Node-B, eNode-B (eNB), or access point (AP) as necessary. The term relay may be replaced with the terms relay node (RN) or relay station (RS). The term terminal may also be replaced with the term user equipment (UE), mobile station (MS), mobile subscriber station (MSS) or subscriber station (SS).

It should be noted that specific terms disclosed in the present invention are proposed for convenience of description and better understanding of the present invention, and the use of these specific terms may be changed to another format within the technical scope or spirit of the present invention.

In some instances, well-known structures and devices are omitted in order to avoid obscuring the concepts of the present invention and the important functions of the structures and devices are shown in block diagram form. The same reference numbers will be used throughout the drawings to refer to the same or like parts.

Exemplary embodiments of the present invention are supported by standard documents disclosed for at least one of radio access systems including an Institute of Electrical and Electronics Engineers (IEEE) 802 system, a $3^{rd}$ Generation Project Partnership (3GPP) system, a 3GPP Long Term Evolution (LTE) system, and a 3GPP2 system. In particular, the steps or parts, which are not described to clearly reveal the technical idea of the present invention, in the embodiments of the present invention may be supported by the above documents. All terminology used herein may be supported by at least one of the above-mentioned documents.

The following technologies can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA may be embodied as wireless (or radio) technology such as UTRA (Universal Terrestrial Radio Access) or CDMA2000. TDMA may be embodied as wireless (or radio) technology such as GSM (Global System for Mobile communications)/GPRS (General Packet Radio Service)/EDGE (Enhanced Data Rates for GSM Evolution). OFDMA may be embodied as wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). UTRA is a part of the UMTS (Universal Mobile Telecommunications System). 3GPP (3rd Generation Partnership Project) LTE (long term evolution) is a part of E-UMTS (Evolved UMTS), which uses E-UTRA. 3GPP LTE employs the OFDMA in downlink and employs the SC-FDMA in uplink. LTE-Advanced (LTE-A) is an evolved version of 3GPP LTE. WiMAX can be explained by IEEE 802.16e standard (WirelessMAN-OFDMA Reference System) and advanced IEEE 802.16m standard (WirelessMAN-OFDMA Advanced system). For clarity, the following description focuses on a 3GPP LTE and 3GPP LTE-A system. However, technical features of the present invention are not limited thereto.

FIG. 1 is a diagram showing the structure of a radio frame used in a 3GPP LTE system. Referring to FIG. 1(a), one radio frame includes 10 subframes and one subframe includes two slots in a time domain. A time required to transmit one subframe is referred to as a transmission time interval (TTI). For example, the length of one subframe may be 1 ms and the length of one slot may be 0.5 ms. One slot includes a plurality of OFDM symbols in a time domain. In a 3GPP LTE system, since OFDM is used in downlink, an OFDM symbol indicates one symbol period. One symbol may be referred to as an SC-FDMA symbol or symbol period in uplink. A resource block (RB) as a resource allocation unit may include a plurality of consecutive subcarriers in one slot. The structure of the radio frame is only exemplary. Accordingly, the number of subframes included in the radio frame, the number of slots included in the subframe or the number of OFDM symbols included in the slot may be changed in various manners.

FIG. 1(b) is a diagram showing the structure of radio frame structure type 2. Radio frame structure type 2 includes two half frames. Each half frame includes five subframes, downlink pilot time slot (DwPTS), a guard period (GP) and an uplink pilot time slot (UpPTS). One subframe includes two slots. The DwPTS is used for initial cell search, synchronization and channel estimation at a UE. The UpPTS is used for channel estimation at a BS and uplink transmission synchronization of a UE. The guard period is used to eliminate interference occurring in uplink due to multi-path delay of a downlink signal between uplink and downlink.

The structure of the radio frame is only exemplary. Accordingly, the number of subframes included in the radio frame, the number of slots included in the subframe or the number of symbols included in the slot may be changed in various manners.

Figure 2:
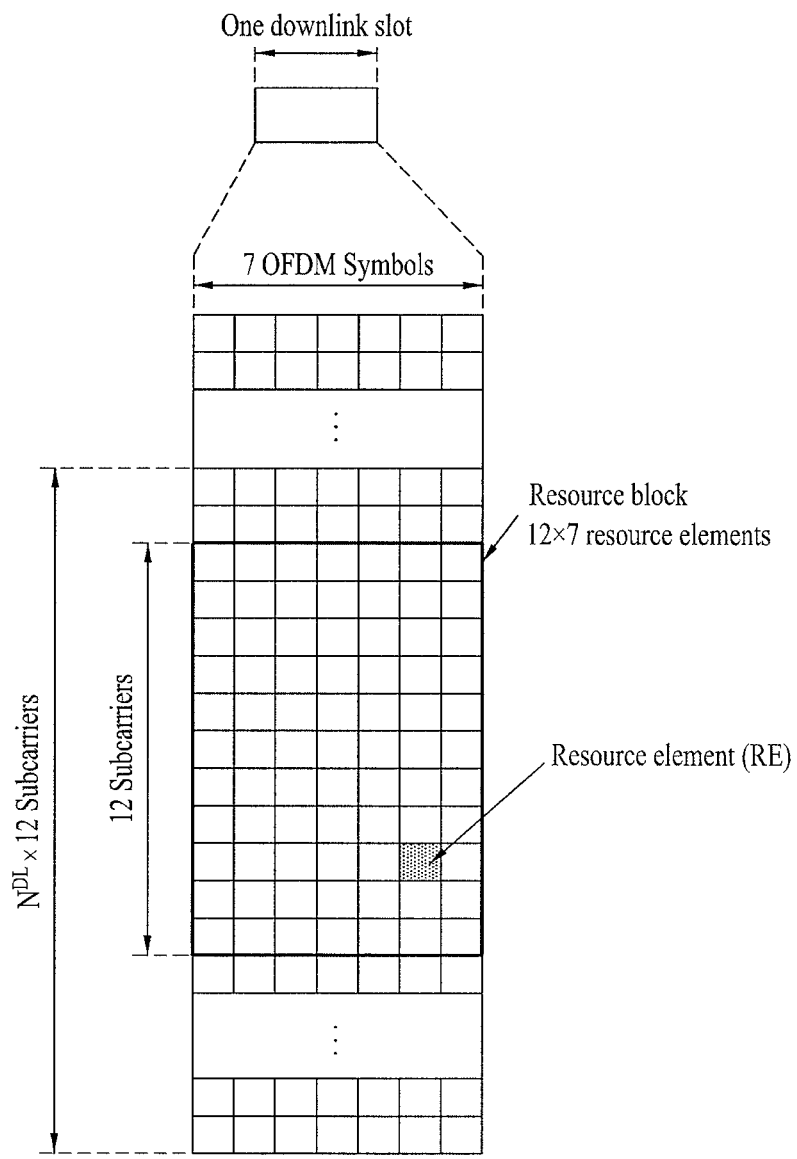
FIG. 2 is a diagram showing a resource grid of a downlink slot.

FIG. 2 is a diagram showing a resource grid of a downlink slot. Referring to FIG. 2, one downlink slot may include seven OFDM symbols in a time domain and one resource block (RB) may include 12 subcarriers in a frequency domain. However, the present invention is not limited thereto. For example, one slot includes 7 OFDM symbols in case of a normal cyclic prefix (CP) and includes 6 OFDM symbols in case of an extended CP. Each element on the resource grid is referred to as a resource element (RE). One RB includes 12×7 REs. The number NDL of RBs included in a downlink slot depends upon downlink transmission bandwidth. The structure of the uplink slot may be equal to the structure of the downlink slot.

Figure 3:
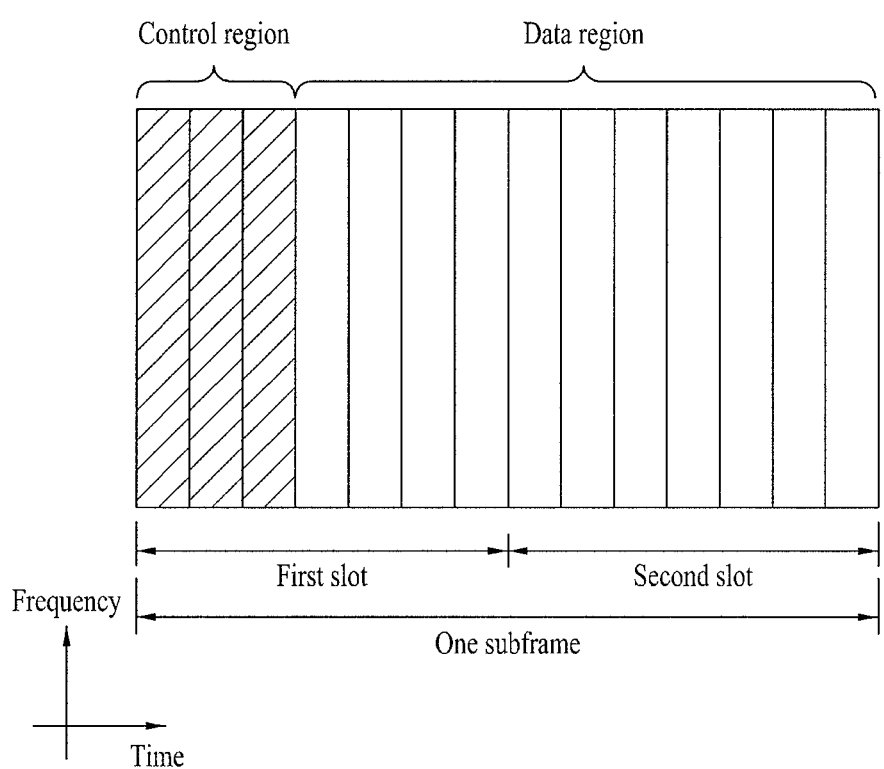
FIG. 3 is a diagram showing the structure of a downlink subframe.

FIG. 3 is a diagram showing the structure of a downlink subframe. A maximum of three OFDM symbols of a front portion of a first slot of one subframe corresponds to a control region to which a control channel is allocated. The remaining OFDM symbols correspond to a data region to which a Physical Downlink Shared Channel (PDSCH) is allocated. Examples of the downlink control channels used in an LTE system include, for example, a Physical Control Format Indicator Channel (PCFICH), a Physical Downlink Control Channel (PDCCH), a Physical Hybrid automatic repeat request Indicator Channel (PHICH), etc.

The PCFICH is transmitted via a first OFDM symbol of a subframe, and includes information about the number of OFDM symbols used to transmit the control channel within the subframe.

The PHICH includes a HARQ ACK/NACK signal in response to uplink transmission. The PDCCH transmits Downlink Control Information (DCI). DCI includes uplink or downlink scheduling information or an uplink transmit (Tx) power control command of an arbitrary UE group according to format.

DCI Format

According to current LTE-A (release 10), DCI formats 0, 1, 1A, 1B, 1C, 1D, 2, 2A, 2B, 2C, 3, 3A and 4 are defined. Here, DCI formats 0, 1A, 3 and 3A are defined to have the same message size in order to reduce the number of times of blind decoding. Such DCI formats may be divided into i) DCI formats 0 and 4 used for uplink scheduling grant, ii) DCI formats 1, 1A, 1B, 1C, 1D, 2, 2A, 2B and 2C used for downlink scheduling allocation, and iii) DCI formats 3 and 3A for power control command according to usage of control information to be transmitted.

DCI format 0 used for uplink scheduling grant may include a carrier indicator necessary for carrier aggregation, an offset used for differentiating between DCI formats 0 and 1A (flag for format 0/format 1A differentiation), a frequency hopping flag indicating whether frequency hopping is used for uplink PUSCH transmission, information about resource block assignment to be used by a UE for PUSCH transmission, a modulation and coding scheme, a new data indicator used to empty a buffer for initial transmission in association with a HARQ process, a TPC command for scheduled for PUSCH, a cyclic shift for demodulation reference signal (DM RS) and OCC index, an uplink (UL) index necessary for TDD operation and channel quality indicator (CQI) request information. Since DCI format 0 uses synchronous HARQ, a redundancy version is not included as in DCI formats related to downlink scheduling allocation. A carrier offset is not included in the DCI format if cross carrier scheduling is not used.

DCI format 4 is newly added in LTE-A release 10 in order to apply spatial multiplexing to uplink transmission in LTE-A. Since DCI format 4 further includes information about spatial multiplexing as compared to DCI format 0, DCI format 4 has a larger message size and further includes additional control information in addition to control information included in DCI format 0. That is, DCI format 4 further includes a modulation and coding scheme for a second transport block, precoding information for multi-antenna transmission and sounding reference signal (SRS) request information. Since DCI format 4 has a size greater than that of DCI format 0, DCI format 4 does not include an offset for differentiating between DCI formats 0 and 1A.

DCI formats 1, 1A, 1B, 1C, 1D, 2, 2A, 2B and 2C related to downlink scheduling allocation may be broadly divided into DCI formats 1, 1A, 1B, 1C and 1D which do not support spatial multiplexing and DCI formats 2, 2A, 2B and 2C which support spatial multiplexing.

DCI format 1C supports only consecutive frequency allocation as compact downlink allocation and does not include a carrier offset and a redundancy version as compared to other formats.

DCI format 1A is a format for downlink scheduling and random access procedure. DCI format 1A may include a carrier offset, an indicator indicating whether distributive downlink transmission is used, PDSCH resource allocation information, a modulation and coding scheme, a redundancy version, a HARQ processor number indicating a processor used for soft combining, a new data indicator used to empty a buffer for initial transmission in association with a HARQ process, a transmit power control command for PUCCH and an uplink index necessary for TDD operation.

Most control information of DCI format 1 is similar to that of DCI format 1A. While DCI format 1A is related to consecutive resource allocation, DCI format 1 supports non-consecutive resource allocation. Accordingly, since DCI format 1 further includes a resource allocation header, control signaling overhead is slightly increased as resource allocation flexibility is increased.

DCI formats 1B and 1D are similar in that precoding information is further included as compared to DCI format 1. DCI format 1B includes PMI confirmation and DCI format 1D includes downlink power offset information. Most control information included in DCI formats 1B and 1C is equal to that of DCI format 1A.

DCI formats 2, 2A, 2B and 2C further includes spatial multiplexing information in addition to most of the control information included in DCI format 1A. That is, a modulation and coding scheme for a second transport block, a new data indicator and a redundancy version may be further included.

DCI format 2 supports closed-loop spatial multiplexing and DCI format 2A supports open-loop spatial multiplexing. DIC formats 2 and 2A include precoding information. DCI format 2B supports dual layer spatial multiplexing combined with beamforming and further includes cyclic shift information for DMRS. DCI format 2C may be understood as an extension of DCI format 2B and supports spatial multiplexing of up to eight layers.

DCI formats 3 and 3A may be used to supplement transmit power control information included in DCI formats for uplink scheduling grant and downlink scheduling allocation, that is, to support semi-persistent scheduling. In case of DCI format 3, a 1-bit command is used per UE and, in case of DCI format 3A, a 2-bit command is used per UE.

Any one of the above-described DCI formats may be transmitted via one PDCCH and a plurality of PDCCHs may be transmitted in a control region. The UE may monitor a plurality of PDCCHs.

PDCCH Processing

In transmission of DCI via a PDCCH, cyclic redundancy check (CRC) is attached to the DCI and a radio network temporary identifier (RNTI) is masked in this process. Here, RNTI may differ according to the purpose of transmitting DCI. More specifically, a P-RNTI may be used in case of a paging message related to network initiated connection establishment, an RA-RNTI may be used in case of a paging message related to random access and an SI-RNTI may be used in case of a paging message related to a system information block (SIB). In case of unicast transmission, a unique UE identifier C-RNTI may be used. The DCI attached with CRC is encoded into a predetermined code and then is adjusted according to the amount of resources used for transmission via rate matching.

In such PDCCH transmission, for efficient processing, a control channel element (CCE) which is a consecutive logical allocation unit when mapping PDCCHs to REs is used. The CCE includes 36 REs, which corresponds to 9 resource element groups (REGs). The number of CCEs necessary for a specific PDCCH is changed according to DCI payload which is a size of control information, cell bandwidth, channel coding rate, etc. More specifically, the number of CCEs for a specific PDCCH may be defined according to PDCCH format as shown in Table 1 below.

TABLE 1

| PDCCH format | Number of CCEs | Number of REGs | Number of bits of PDCCH |
|---|---|---|---|
| 0 | 1 | 9 | 72 |
| 1 | 2 | 18 | 144 |
| 2 | 4 | 36 | 288 |
| 3 | 8 | 72 | 576 |

As shown in Table 1, the number of CCEs is changed according to PDCCH format. For example, if a channel state becomes bad while a transmitter uses PDCCH format 0, the PDCCH format may be changed to PDCCH format 2, that is, the PDCCH format may be adaptively used.

Blind Decoding

A PDCCH may use any one of the four formats as described above. However, a UE is not informed of the PDCCH format. Accordingly, the UE should perform decoding in a state of being unaware of the PDCCH format, which is referred to as blind decoding. When the UE decodes all possible CCEs used for downlink with respect to each PDCCH format, a large burden is imposed on the UE. Therefore, a search space is defined in consideration of scheduling restrictions and the number of times of decoding.

That is, the search space is a set of candidate PDCCHs including CCEs which should be decoded by the UE at an aggregation level. Here, the aggregation level and the number of PDCCH candidates may be defined as shown in Table 2 below.

TABLE 2

| | Search space | | Number of PDCCH |
|---|---|---|---|
| | Aggregation level | Size (CCE unit) | candidates |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

As shown in Table 2, since four aggregation levels are present, the UE has a plurality of search spaces according to aggregation level.

As shown in Table 2 above, the search space may be divided into a UE-specific search space and a common search space. The UE-specific search space is used for specific UEs. Each UE may monitor the UE-specific search space (attempt to decode the set of PDCCH candidates according to possible DCI format), check an RNTI and CRC masked to a PDCCH and acquire control information if the RNTI and CRC are valid.

The common search space is used when a plurality of UEs or all UEs need to receive a PDCCH for dynamic scheduling of system information or paging message. The common search space may be used for a specific UE for resource management. In addition, the common search space may overlap the UE-specific search space.

Figure 4:
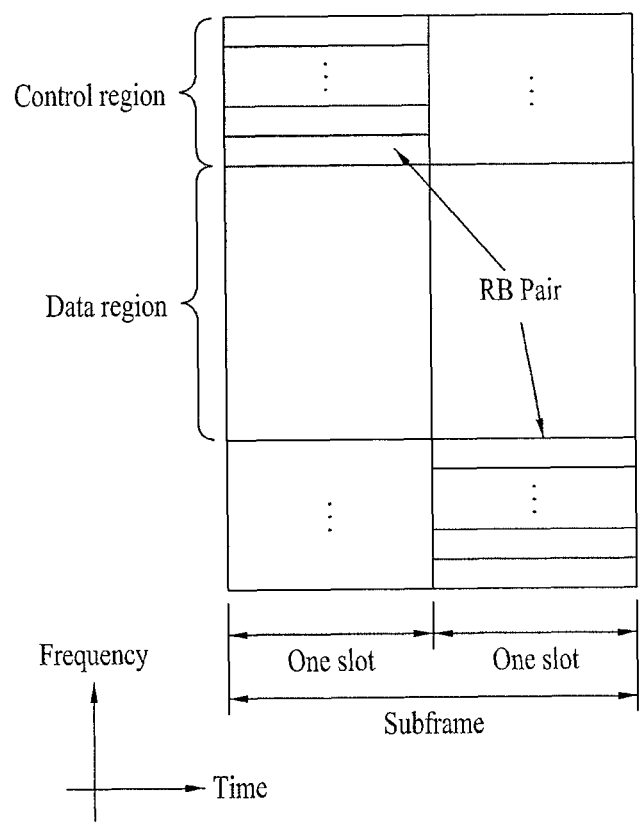
FIG. 4 is a diagram showing the structure of an uplink subframe.

FIG. 4 is a diagram showing the structure of an uplink subframe. The uplink subframe may be divided into a control region and a data region in a frequency domain. A physical uplink control channel (PUCCH) including uplink control information is allocated to the control region. A physical uplink shared channel (PUSCH) including user data is allocated to the data region. In order to maintain a single carrier property, one UE does not simultaneously transmit a PUCCH and a PUSCH. The PUCCH for one UE is allocated to a resource block (RB) pair in a subframe. RBs belonging to the RB pair occupy different subcarriers with respect to two slots. This is referred to as frequency hopping of an RB pair allocated to the PUCCH in a slot boundary.

Reference Signal (RS)

When packets are transmitted in a wireless communication system, since the transmitted packets are transmitted via a radio channel, signal distortion may occur in a transmission process. In order to enable a receiver to accurately receive the distorted signal, distortion of the received signal should be corrected using channel information. In order to detect the channel information, a method of transmitting a signal which is known to a transmitter and a receiver and detecting channel information using a distortion degree when the signal is received via the channel is mainly used. The signal is referred to as a pilot signal or a reference signal.

If data is transmitted and received using multiple antennas, a channel state between each transmission antenna and each reception antenna should be known in order to accurately receive a signal. Accordingly, a reference signal is present per transmission antenna and, more particularly, per antenna port.

The reference signal may be divided into an uplink reference signal and a downlink reference signal. In a current LTE system, the uplink reference signal includes:

i) a demodulation reference signal (DM-RS) for channel estimation for coherent demodulation of information transmitted via a PUSCH and a PUCCH, and ii) a sounding reference signal (SRS) for measuring uplink channel quality of a network at different frequencies at the BS.

The downlink reference signal includes:

i) a cell-specific reference signal (CRS) shared by all UEs in the cell, ii) a UE-specific reference signal for a specific UE, iii) a demodulation-reference signal (DM-RS) transmitted for coherent demodulation if a PDSCH is transmitted, iv) a channel state information-reference signal (CSI-RS) for delivering channel state information (CSI) if a downlink DMRS is transmitted, v) an MBSFN reference signal transmitted for coherent demodulation of a signal transmitted in a multimedia broadcast single frequency network (MBSFN) mode, and vi) a positioning reference signal used to estimate geographical position information of the UE.

The reference signals may be broadly divided into two reference signals according to the purpose thereof. There are a reference signal for acquiring channel information and a reference signal used for data demodulation. Since the former reference signal is used when the UE acquires channel information in downlink, the reference signal is transmitted over a wide band and even a UE which does not receive downlink data in a specific subframe should receive the reference signal. This reference signal is used even in handover. The latter reference signal is sent by the BS along with resources in downlink. The UE receives the reference signal to perform channel measurement and data modulation. This reference signal is transmitted in a region in which data is transmitted.

The CRS is used for two purposes such as channel information acquisition and data demodulation and the UE-specific reference signal is used only for data demodulation. The CRS is transmitted per subframe over a wide band and reference signals for a maximum of four antenna ports are transmitted according to the number of transmit antennas of the base station.

For example, if the number of transmit antennas of the base station is 2, CRSs for antenna ports 0 and 1 are transmitted and, if the number of transmit antennas of the base station is 4, CRSs for antenna ports 0 to 3 are transmitted.

FIG. 5 is a diagram illustrating a pattern in which CRSs and DRSs defined in a legacy 3GPP LTE system (e.g., release-8) are mapped onto resource block (RB) pairs. A downlink RB pair as a mapping unit of a reference signal may be expressed by one subframe on a time axis and 12 subcarriers on a frequency axis. That is, one RB pair has 14 OFDM symbols in case of a normal CP (FIG. 7($a$)) and 12 OFDM symbols in case of an extended CP (FIG. 7($b$)).

Figure 7:
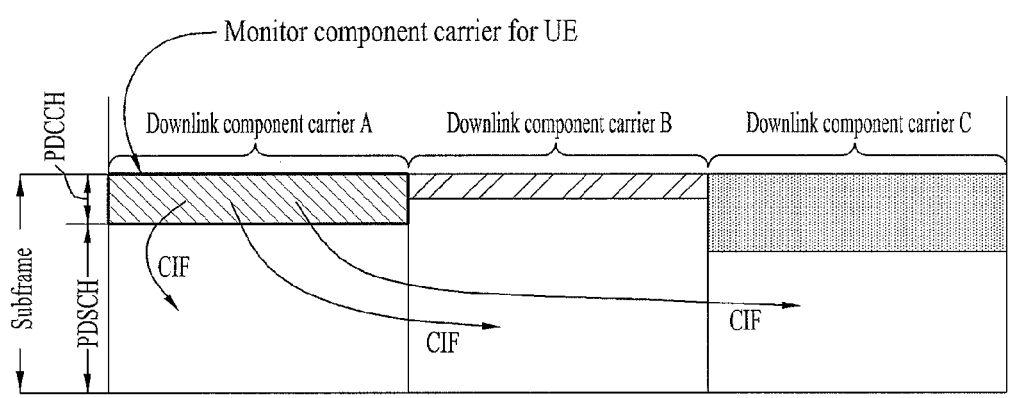
FIG. 7 is a diagram illustrating cross carrier scheduling.

FIG. 5 shows locations of the reference signals on the RB pairs in a system in which the base station supports four transmit antennas. In FIG. 7, resource elements (REs) denoted by "0", "1", "2" and "3" represent the locations of the CRSs for antenna port indices 0, 1, 2 and 3. Meanwhile, the RE denoted by "D" represents the location of the DMRS.

Sounding Reference Signal (SRS)

A sounding reference signal (SRS) is used for the base station to perform channel quality measurement to perform frequency-selective scheduling in uplink and is not associated with uplink data and/or control information transmission. However, the present invention is not limited thereto and the SRS may be used for the purpose of supporting various start-up functions of the UEs which are not recently scheduled or for improved power control. The start-up functions may include, for example, initial modulation and coding scheme (MCS), initial power control for data transmission, timing advance and frequency semi-selective scheduling (scheduling in which frequency resources are selectively allocated in a first slot of a subframe and pseudo-random hopping to another frequency is performed in a second slot).

The SRS may be used for downlink channel quality measurement on the assumption that radio channels are reciprocal in uplink and downlink. Such assumption is particularly valid in a time division duplexing (TDD) system in which uplink and downlink share the same frequency bandwidth and are differentiated in a time domain.

The subframe in which the SRS is transmitted by an arbitrary UE in a cell is indicated by cell-specific broadcast signaling. A 4-bit cell-specific "SrsSubframeConfiguration" parameter indicates 15 possible configurations of a subframe in which an SRS may be transmitted within each radio frame. By such configurations, flexibility for adjusting SRS overhead according to a network arrangement scenario may be provided. The remaining one ($16^{th}$) configuration of the parameter switches off SRS transmission in the cell and may be suitable for a cell serving high-speed UEs.

The SRS is always transmitted in a last SC-FDMA symbol of a configured subframe. Accordingly, the SRS and the DMRS are located on different SC-FDMA symbols. PUSCH data transmission is not allowed in SC-FDMA symbols specified for SRS transmission and thus sounding overhead does not exceed about 7% even if this is highest (that is, even in the case in which SRS transmission symbols are present in all subframes).

Each SRS symbol is generated by a base sequence (random sequence or Zadoff-Chu (ZC)-based sequence set) with respect to a given time unit and frequency band and all UEs in a cell use the same base sequence. At this time, SRS transmission from a plurality of UEs in a cell in the same time unit and the same frequency band is orthogonally differentiated by different cyclic shifts of the base sequence allocated to the plurality of UEs. The SRS sequences of the different cells may be differentiated by allocating different base sequences to cells but orthogonality between the different base sequences is not secured.

Carrier Aggregation

Figure 6:
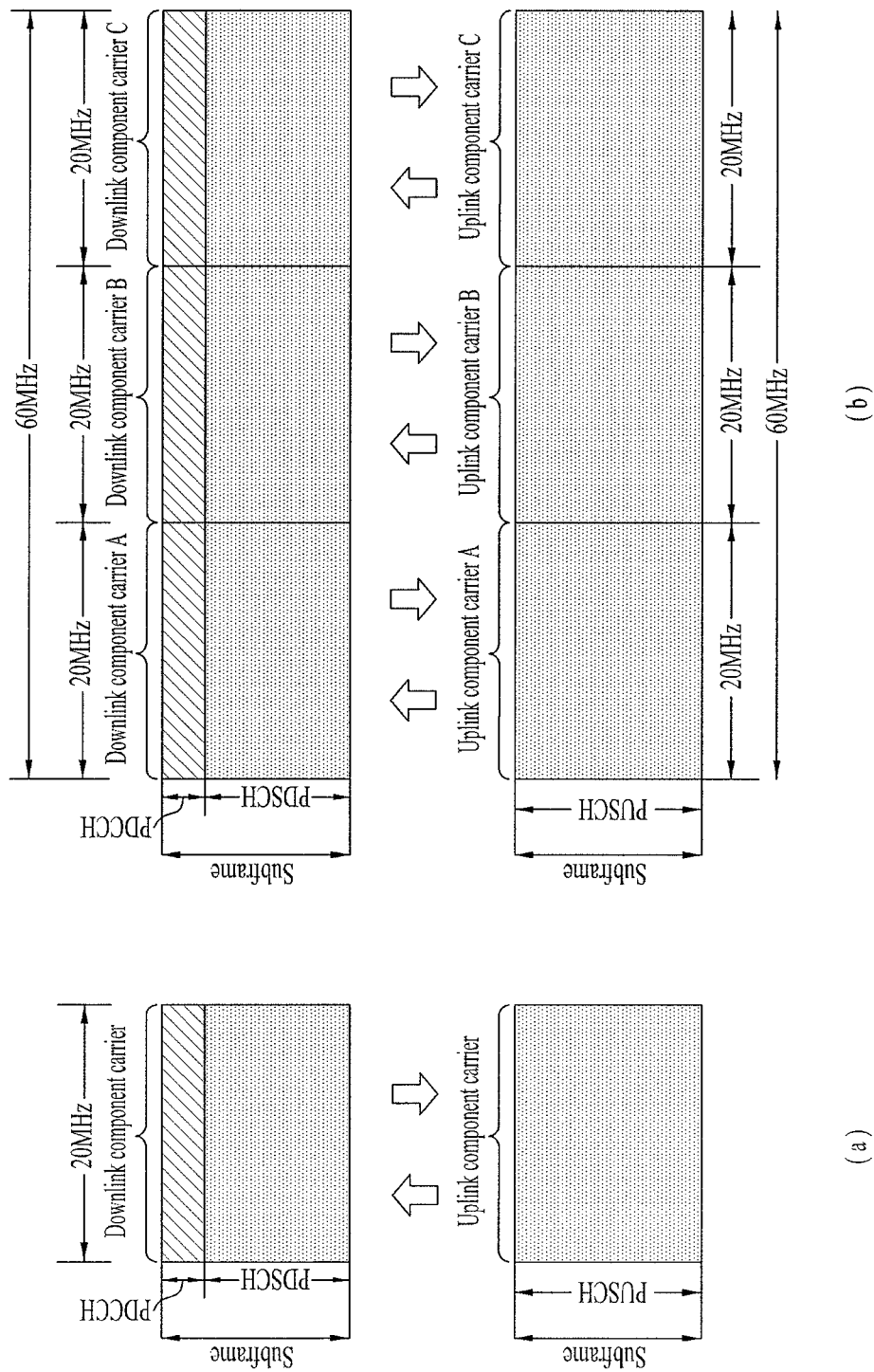
FIG. 6 is a diagram illustrating carrier aggregation.

FIG. 6 is a diagram illustrating carrier aggregation. Prior to description of carrier aggregation, the concept of a cell introduced in order to manage radio resources in LTE-A will be described. The cell may be a combination of downlink resources and uplink resources. Here, the uplink resources are not mandatory. Accordingly, the cell may be composed of downlink resources alone or downlink resources and uplink resources. However, this is currently defined in LTE-A release 10 and the cell may be composed of uplink resources alone. Downlink resources may be referred to as downlink component carriers (DL CCs) and the uplink resources may be referred to as uplink component carriers (UL CCs). DL CC and UL CC may be expressed by a carrier frequency and the carrier frequency refers to a center frequency of the cell.

The cell may be divided into a primary cell (PCell) operating on a primary frequency and a secondary cell (S Cell) operating on a secondary frequency. The PCell and the SCell may be referred to as a serving cell. The PCell may be a cell indicated in an initial connection establishment process, a connection re-establishment process or a handover process at the UE. In addition, the PCell refers to a cell which becomes a center of control related communication among the serving cells configured in the CA environment. That is, the UE may be allocated a PUCCH from only the PCell thereof to perform transmission. The SCell may be configured after RRC connection establishment and used to provide additional radio resources. The serving cells excluding the PCell in the CA environment are SCells. In case of a UE which is in an RRC_connected state but does not set or support carrier aggregation, only one serving cell composed of a PCell exists. In contrast, in case of a UE which is in an RRC_CONNECTED state and sets carrier aggregation, one or more serving cells exist. The serving cell includes a PCell and all SCells. For a UE supporting CA, a network may configure one or more SCells in addition to the PCell initially configured in a connection establishment process after starting an initial security activation process.

Hereinafter, CA will be described with reference to FIG. 6. CA was introduced for the purpose of using a wider bandwidth according to high transfer rate requirements. CA may involve aggregating two or more component carriers having different carrier frequencies. Referring to FIG. 6, FIG. 6(a) shows a subframe in case of using one CC in a legacy LTE system and FIG. 8(b) shows a subframe in case of using CA. FIG. 6(b) shows the case in which three CCs each having a bandwidth of 20 MHz are used to support a bandwidth of 60 MHz. The CCs may or may not be consecutive.

A UE may simultaneously receive and monitor downlink data via a plurality of DL CCs. Linkage between a DL CC and a UL CC may be indicated by system information. DL CC/UL CC linkage may be fixed or semi-statically configured with respect to the system. In addition, even if the overall system bandwidth is composed of N CCs, the frequency bandwidth which may be monitored/received by a specific UE may be restricted to M (<N) CCs. Various parameters for CA may be configured in a cell-specific, UE group-specific or UE-specific manner.

FIG. 7 is a diagram illustrating cross carrier scheduling. Cross carrier scheduling means that all downlink scheduling allocation information of different DL CCs is included in a control region of a DC CC of any one of a plurality of serving cells or all uplink scheduling grant information for a plurality of UL CCs linked to a DL CC is included in a control region of a DC CC of any one of a plurality of serving cells.

First, a carrier indicator field (CIF) will be described.

The CIF may or may not be included in a DCI format transmitted via a PDCCH as described above. If the CIF is included, this indicates that cross carrier scheduling is applied. If cross carrier scheduling is not applied, downlink scheduling allocation information is valid on a DL CC on which downlink scheduling allocation information is currently transmitted. In addition, uplink scheduling grant is valid with respect to one UL CC linked to a DL CC on which downlink scheduling allocation information is transmitted.

If cross carrier scheduling is applied, the CIF indicates a CC related to downlink scheduling allocation information transmitted via a PDCCH on any one DL CC. For example, referring to FIG. 9, downlink allocation information for DL CC B and DL CC C, that is, information about PDSCH resources is transmitted via a PDCCH in a control region of DL CC A. The UE may monitor DL CC A to confirm the resource region of the PDSCH and the CC via the CIF.

Whether a CIF is included in a PDCCH or not may be semi-statically determined and the CIF may be enabled via higher layer signaling in a UE-specific manner. If the CIF is disabled, a PDCCH on a specific DL CC may allocate PDSCH resources on the same DL CC and allocate PUSCH resources on a UL CC linked to the specific DL CC. In this case, the same coding scheme, CCE based resource mapping and DCI format as an existing PDCCH structure are applicable.

If the CIF is enabled, a PDCCH on a specific DL CC may allocate PDSCH/PUSCH resources on one DL/UL CC indicated by a CIF among a plurality of aggregated CCs. In this case, a CIF may be additionally defined in an existing PDCCH DCI format, a field having a fixed length of 3 bits may be defined or a CIF location may be fixed regardless of DCI format size. Even in this case, the same coding scheme, CCE based resource mapping and DCI format as an existing PDCCH structure are applicable.

Even if the CIF is present, the base station may allocate a DL CC set which will monitor a PDCCH. Accordingly, it is possible to reduce a burden on blind decoding of a UE. A PDCCH monitoring CC set is a part of all aggregated DL CCs and a UE may perform detection/decoding of a PDCCH only in the corresponding CC set. That is, in order to schedule a PDSCH/PUSCH with respect to a UE, the base station may transmit a PDCCH only on a PDCCH monitoring set. The PDCCH monitoring DL CC set may be configured in a UE-specific, a UE group-specific or cell-specific manner. For example, as shown in FIG. 7, if three DL CCs are aggregated, DL CC A may be set as a PDCCH monitoring DL CC. If the CIF is disabled, a PDCCH on each DL CC may schedule only a PDSCH on DL CC A. If the CIF is enabled, not only a PDCCH on DL CC A but also a PDSCH on another DL CC may be scheduled. If DL CC A is set as a PDCCH monitoring CC, a PDSCH is not transmitted on DL CC B and DL CC C.

In a system to which CA is applied, a UE may receive a plurality of PDSCHs via a plurality of downlink carriers. In this case, the UE should transmit ACK/NACK for each data on one UL CC in one subframe. If a plurality of ACKs/NACKs is transmitted in one subframe using PUCCH format 1a/1b, high transmit power is required, a PAPR of uplink transmission is increased and a transmit power amplifier is inefficiently used. Thus, a transmittable distance from the base station to the UE may be decreased. In order to transmit a plurality of ACKs/NACKs via one PUCCH, ACK/NACK bundling or ACK/NACK multiplexing is applicable.

ACK/NACK information of a large number of pieces of downlink data according to CA and/or a large number of pieces of downlink data transmitted via a plurality of DL subframes in a TDD system may be transmitted via a PUCCH in one subframe. In this case, if the number of ACK/NACK bits to be transmitted is greater than the number of bits supported by ACK/NACK bundling or multiplexing, ACK/NACK information may not be accurately transmitted using the above-described method.

Coordinated Multi Point (CoMP)

According to improved system performance requirements of a 3GPP LTE-A system, CoMP transmission/reception technology (co-MIMO, collaborative MIMO or network MIMO) is proposed. CoMP technology may increase performance of a UE located at a cell edge and increase average sector throughput.

In general, in a multi-cell environment in which a frequency reuse factor is 1, performance and average sector throughput of a UE located at a cell edge may be reduced due to inter-cell interference (ICI). In order to reduce ICI, in a legacy LTE system, a method of enabling a UE located at a cell edge to have appropriate throughput and performance in an environment restricted by interference using a simple passive method such as fractional frequency reuse (FFR) via specific power control was applied. However, ICI is reduced or reused by a UE as a desired signal more preferably than reduction of frequency resources used per cell. In order to accomplish the above-described object, a CoMP transmission scheme is applicable.

The CoMP scheme applicable to downlink may be largely divided into a joint processing (JP) scheme and a coordinated scheduling/beamforming (CS/CB) scheme.

In the JP scheme, each point (BS) of a CoMP unit may use data. The CoMP unit refers to a set of BSs used in the CoMP scheme. The JP scheme may be classified into a joint transmission scheme and a dynamic cell selection scheme.

The joint transmission scheme refers to a scheme for simultaneously transmitting a PDSCH from a plurality of points (a part or the whole of the CoMP unit). That is, data transmitted to a single UE may be simultaneously transmitted from a plurality of transmission points. According to the joint transmission scheme, it is possible to coherently or non-coherently improve the quality of the received signals and to actively eliminate interference with another UE.

The dynamic cell selection scheme refers to a scheme for transmitting a PDSCH from one point (of the CoMP unit). That is, data transmitted to a single UE at a specific time is transmitted from one point and the other points in the coordinated unit do not transmit data to the UE at that time. The point for transmitting the data to the UE may be dynamically selected.

According to the CS/CB scheme, the CoMP units may cooperatively perform beamforming of data transmission to a single UE. Although only a serving cell transmits the data, user scheduling/beamforming may be determined by the coordination of the cells of the CoMP unit.

In uplink, coordinated multi-point reception refers to reception of a signal transmitted by coordination among a plurality of geographically separated points. CoMP schemes applicable to uplink may be classified into Joint Reception (JR) and Coordinated Scheduling/Beamforming (CS/CB).

JR indicates that a plurality of reception points receives a signal transmitted through a PUSCH, the CS/CB scheme indicates that only one point receives a PUSCH, and user scheduling/beamforming is determined by the coordination of the cells of the CoMP unit.

If such a CoMP system is used, the UE may commonly receive data from a multi-cell base station. In addition, each base station may simultaneously support one or more UEs using the same radio frequency resources to improve system performance. In addition, the base station may perform space division multiple access (SDMA) based on channel state information between the base station and the UE.

In a CoMP system, a serving base station and one or more cooperative base stations are connected to a scheduler via a backbone network. The scheduler may operate by receiving information about a channel state between each UE and each cooperative base station measured by each base station via the backbone network. For example, the scheduler may schedule information about coordinated MIMO operation with respect to a serving base station and one or more cooperative base stations. That is, the scheduler may directly send an instruction for coordinated MIMO operation to each base station.

As described above, the CoMP system indicates that a plurality of cells is grouped into one group to operate as a virtual MIMO system and a communication scheme of a MIMO system using multiple antennas is applicable.

Figure 8:
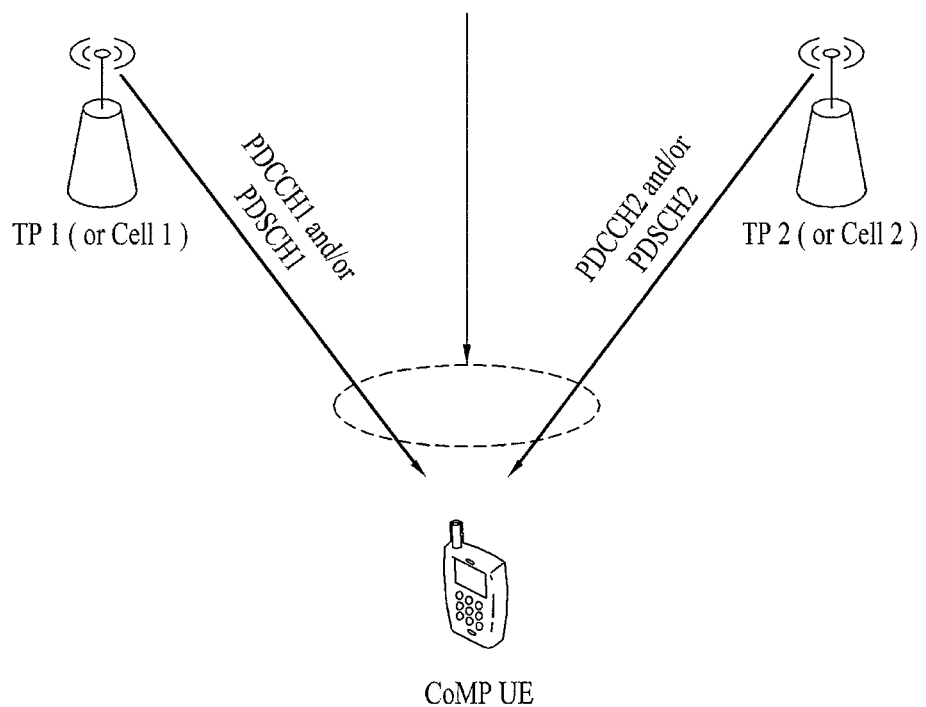
FIG. 8 is a diagram showing cooperative transmission from different transmission points or cells to a user equipment (UE)

Among the above-described CoMP schemes, a dynamic cell selection scheme will be described in more detail with reference to FIG. 8. FIG. 8 shows cooperative transmission from different transmission points or cells to a UE. In a general CoMP scheme, any one transmission point (e.g., TP1) transmits a PDCCH and another transmission point (e.g., TP2) may transmit data associated with the PDCCH. A transmission point for transmitting data (PDSCH, codeword or transport block) may be indicated using the CIF field of the DCI format. The transmission point for transmitting data may be dynamically changed according to change in channel environment.

In a conventional dynamic cell selection scheme, even if a transmission point of a PDSCH is dynamically changed, since a PDCCH is fixedly transmitted from a specific transmission point, there is a limitation in adaptively coping with change in channel environment. Hereinafter, in the embodiment of the present invention, various methods for transmitting a PDCCH while dynamically changing a transmission point in CoMP will be described. For reference, although the concept of above-described CCE and REG is applicable to an e-PDCCH in the following description (CCE=9 REGs and REG=4 REs), a CCE and REG having another size, that is, eCCE and eREG (e.g., eCCE=2 eREGs) is also applicable.

Figure 9:
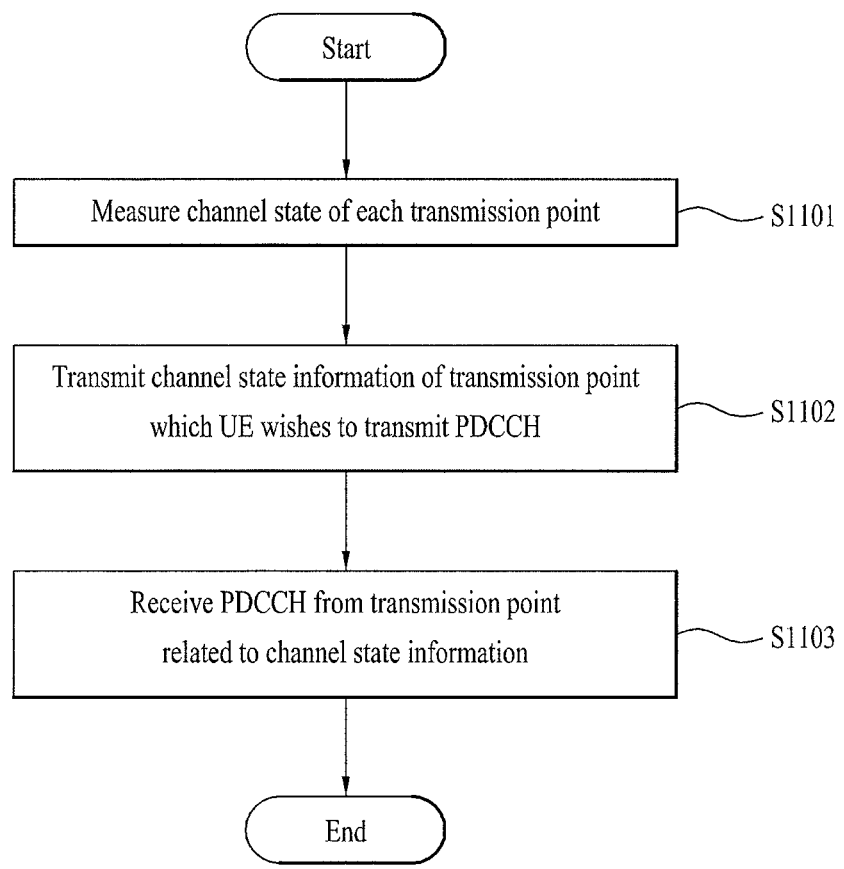
FIG. 9 is a diagram illustrating a method of dynamically determining a transmission point for transmitting a PDCCH according to an embodiment of the present invention.

FIG. 9 is a diagram illustrating a method of dynamically determining a transmission point for transmitting a PDCCH according to an embodiment of the present invention. The transmission point for transmitting the PDCCH may be determined per subframe or with a specific period (e.g., a transmission period of channel state report).

Referring to FIG. 9, a UE measures a channel state based on a signal from each transmission point which performs cooperative transmission (S901). A reference signal receive power (RSRP) obtained by measuring the level of a CRS in downlink, a received signal strength indicator (RSSI) including noise power and interference from neighboring cells as a total receive power value received by the UE and a reference signal received quality (RSRQ) value which is measured in the form of N*RSRP/RSSI (N is the number of RBs of corresponding bandwidth upon RSSI measurement) may be used to measure the channel state.

The UE may transmit channel state information (CSI) of a transmission point which the UE wishes to transmit a PDCCH, in consideration of the channel state of each transmission point (S902). CSI may be transmitted via a PUCCH if the UE is allocated resources and may be transmitted via a PUSCH if the UE is not allocated resources.

The transmission point, which has received the CSI of the specific transmission point transmitted by the UE, may determine the specific transmission point as the transmission point for transmitting the PDCCH. Here, if the transmission point, which has received the CSI, and the transmission point which the UE wishes to transmit the PDCCH are different, the transmission point, which has received the CSI, may share the information with other transmission points. Thereafter, the UE, which has transmit the CSI of the specific transmission point, may receive the PDCCH from the specific transmission point (S903). In summary, if the UE transmits the CSI of the specific transmission point, the transmission point may determine the specific transmission point as the transmission point for transmitting the PDCCH according to the request of the UE.

As another example, the UE may select two or more transmission points which the UE wishes to transmit the PDCCH, transmit CSI of the transmission points and select one of the transmission points. In this case, it is necessary to indicate which transmission point transmits the PDCCH.

In addition, even when the UE transmits the CSI of the specific transmission point, the transmission point may determine a transmission point other than the specific transmission point as the transmission point for transmitting the PDCCH. In this case, it is necessary to indicate which transmission point transmits the PDCCH.

In the above description, the transmission point for transmitting the PDCCH is dynamically changed and the number of transmission points for transmitting the PDCCH is one. Hereinafter, the case in which the PDCCH is partitioned and transmitted by two or more transmission points will be described. In the following description, the PDCCH is partitioned into two parts and, in this case, the number of transmission points is restricted to 2.

Figure 10:
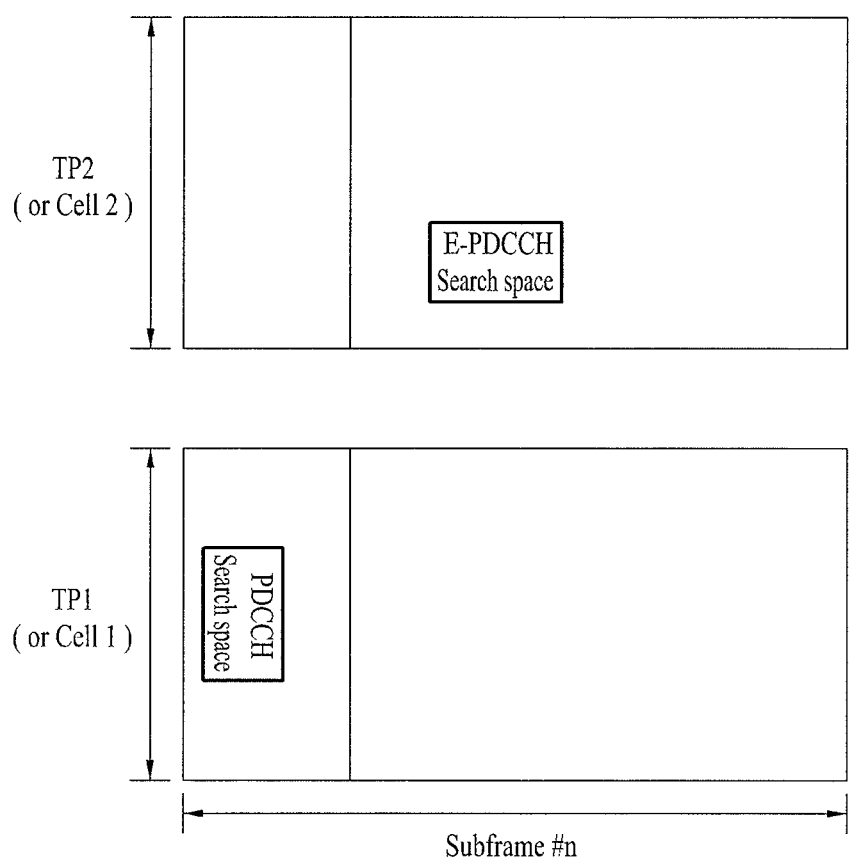
FIG. 10 is a diagram illustrating the case in which two or more transmission points transmit a PDCCH according to an embodiment of the present invention.

FIG. 10 is a diagram illustrating the case in which two or more transmission points transmit a PDCCH according to an embodiment of the present invention.

Referring to FIG. 10, a first transmission point and a second transmission point transmit subframes and each subframe includes a first search space (PDCCH search space) and a second search space (E-PDCCH search space). Unlike FIG. 12, the first search space and the second search space may be located in a control region of a legacy LTE/LTE-A system.

Here, the first search space and the second search space may correspond to a search space if cooperative transmission is not performed, that is, if any one transmission point configures a search space to perform transmission. That is, the search space of a legacy LTE/LTE-A system may be partitioned/split/divided into first and second search spaces.

The first and second search spaces respectively configured in the first and second transmission points may be partitioned into various elements related to the search space, which was described in "PDCCH processing" and "blind decoding" of the above description, such as aggregation level, DCI format and CSS/USS. Hereinafter, various elements will be described.

The first search space may be composed of a common search space and the second search space may be composed of a UE-specific search space. That is, the first search space may be for DCI for a plurality of UEs including a UE for receiving the PDCCH or a specific UE group and the second search space may be for DCI for the UE for receiving the PDCCH. In other words, one search space may be partitioned based on the UE-specific search space or the common search space.

The first search space and the second search space may be partitioned according to DCI format. For example, the first search space may be configured for DCI format and DCI format 1A which do not depend on a transmission mode and the second search space may be configured for other DCI formats which depend on a transmission mode. Alternatively, the first search space may be partitioned for DCI formats 0 and 4 related to uplink grant and the second search space may be partitioned for the other DCI formats.

In addition, the first search space and the second search space may be partitioned according to aggregation level, that is, aggregate of control channel elements, which is a blind decoding unit. In a legacy LTE/LTE-A system, an aggregation level is defined as 1, 2, 4 and 8, the first search space may be configured for aggregation levels 1 and 2 and the second search space may be configured for aggregation levels 4 and 8. This is applicable to the case in which the channel state of the first transmission point is better than that of the second transmission point.

As another method of partitioning the search space, the number of times of blind decoding, that is, the number of PDCCH candidates included in the search space, may be used. In a legacy LTE/LTE-A system, the numbers of PDCCH candidates are respectively defined as 6, 6, 2 and 2 with respect to aggregation levels 1, 2, 4 and 8 and the PDCCH candidates may be equally partitioned such that three PDCCH candidates, three PDCCH candidates, one PDCCH candidate and one PDCCH candidate may be included in the first or second search spaces. The number of PDCCH candidates included in each search space may be non-equally partitioned for other reasons. For example, if the channel state with the first transmission point is bad, the PDCCH candidates may be partitioned such that the number of PDCCH candidates is 4, 4, 1 and 1 in the first search space and the number of PDCCH candidates is 2, 2, 1 and 1 in the second search space.

The search space may be partitioned and transmitted at a plurality of transmission points. In this case, a plurality of transmission points for transmitting the PDCCH may be determined using feedback of channel state information as in description of FIG. 15. More specifically, the UE may measure a channel state and transmit CSI of a plurality of transmission points which the UE wishes to transmit the PDCCH, and the transmission point may transmit a subframe including partitioned search spaces to the UE.

Here, when reporting the CSI of the transmission points which the UE wishes to transmit the PDCCH, priority may be assigned and transmitted along with this information. Priority may be determined based on a good channel state. For example, if the UE transmits CSI #1 for the first transmission point and CSI #2 for the second transmission point as priorities of CSI #1 and CSI #2, the first transmission point may be determined as a transmission point for transmitting a subframe including the first search space and the second transmission point may be determined as a transmission point for transmitting a subframe including the second search space. In this case, the first search space and the second search space are partitioned in consideration of the channel state information.

Channel state information and search space partitioning are applicable as in the following example. The UE may transmit CSI #1 for the first transmission point and CSI #2 for the second transmission point in descending order of channel state. In this case, as described above, the first transmission point may transmit the first search space and the second transmission point may transmit the second search space.

The first search space may be configured such that the number of times of blind decoding is 4, 4, 1 and 1 and the second search space may be configured such that the number of times of blind decoding is 2, 2, 1 and 2, with respect to aggregation levels 1, 2, 4 and 8. In this case, since blind decoding is further performed in the search space transmitted by the transmission point having a better channel state, overall throughput may be improved. Alternatively, if the first search space is for DCI format 1A which does not depend on the transmission mode and the second search space is for DCI format which depends on the transmission mode, fallback DCI may be acquired from the search space transmitted by the transmission point having a better channel state. Similarly, the first search space may be partitioned for aggregation levels 1 and 2 and the second search space may be partitioned for aggregation levels 4 and 8. The relationship between channel state information and search space partitioning is not limited to the above example and may be variously set by other elements such as system implementation methods.

In the case in which the PDCCH is transmitted from two or more transmission points and the above-described search space partitioning is applied, a method of pre-fixing a transmission point for transmitting a PDCCH of a first search space may be used. That is, since the UE knows that a first search space is present on a subframe transmitted by the first transmission point, the UE may monitor the first search space, primarily detect the PDCCH, and secondarily confirm a transmission point for transmitting a PDCCH of a second search space from the detected PDCCH.

In this case, the first search space may include a field indicating the second transmission point and this field may be included by reusing an existing field of DCI format transmitted via the first search space (e.g., a downlink allocation index field or a carrier indicator field present only in case of TDD) or may be newly defined. If the first search space is located in a control region of a subframe and the second search space is located in a data region (in case of e-PDCCH), a field indicating the second transmission point may indicate information such as the location of e-PDCCH, the transmission point for transmitting the PDSCH, etc. in addition to the second transmission point, which will be described with reference to FIGS. 11 to 13.

Figure 11:
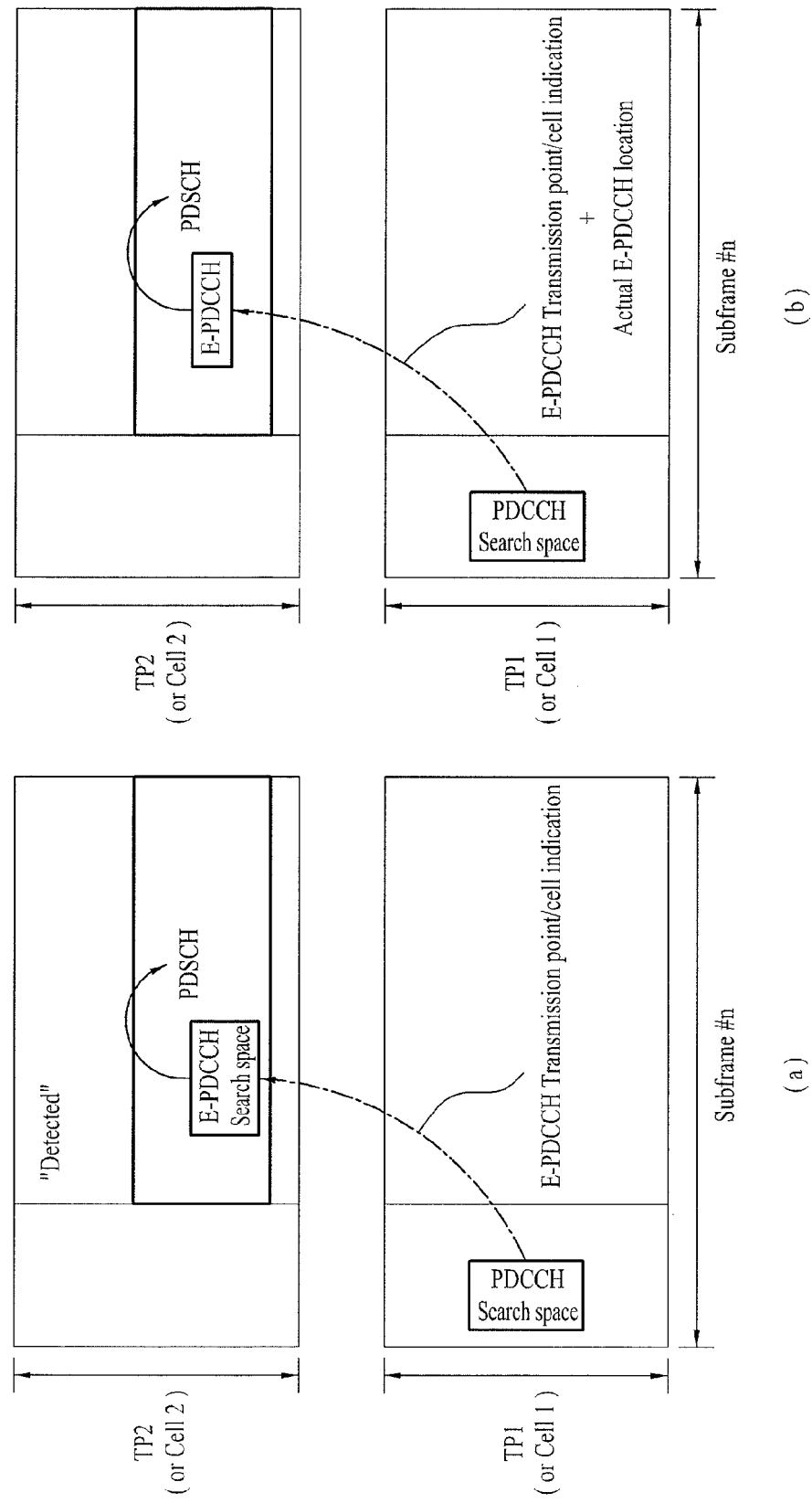
FIGS. 11 to 13 are diagrams illustrating PDCCH transmission and stepwise detection at two or more transmission points according to an embodiment of the present invention.

Referring to FIG. 11(a), it can be seen that the first search space is located in a control region at subframe #n transmitted by the first transmission point TP1 and the second search space is located in a data region at subframe #n transmitted by the second transmission point TP2. The UE primarily performs blind decoding in the control region of the subframe transmitted by the first transmission point for transmitting the PDCCH. As a result, the UE may confirm which transmission point (TP2 in FIG. 11) transmits the subframe in which the second search space is located. Thereafter, the UE may perform blind decoding in the data region of the second transmission point to acquire control information and acquire data from the PDSCH region indicated by the control information. FIG. 11(b) shows the case in which the UE primarily monitors the search space of the first transmission point and acquires the transmission point for transmitting the subframe including the second search space and the actual location/position of the second search space. In this case, the UE may perform blind decoding in the second search space of the second transmission point and acquire data from the PDSCH region indicated by the control information. The location of the second search space may be indicated by individual information such as i) RB index, ii) CCE index or iii) antenna port or a combination thereof.

Figure 12:
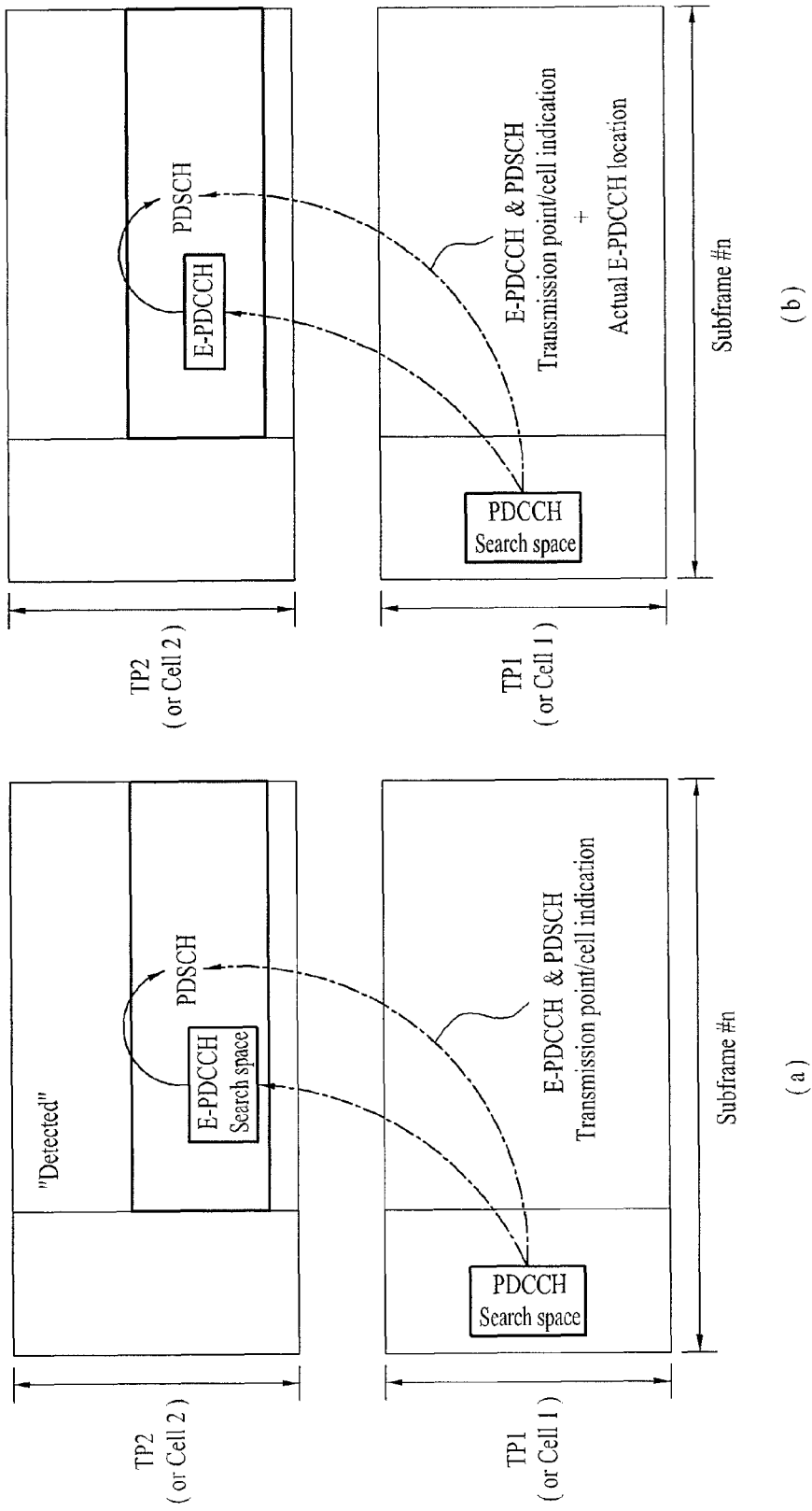

FIG. 12 shows the case in which the transmission point for transmitting the PDSCH is further confirmed as compared to the case in which information about the second transmission point for transmitting the subframe including the second search space is confirmed as the result of monitoring the first search space in FIG. 11.

Figure 13:
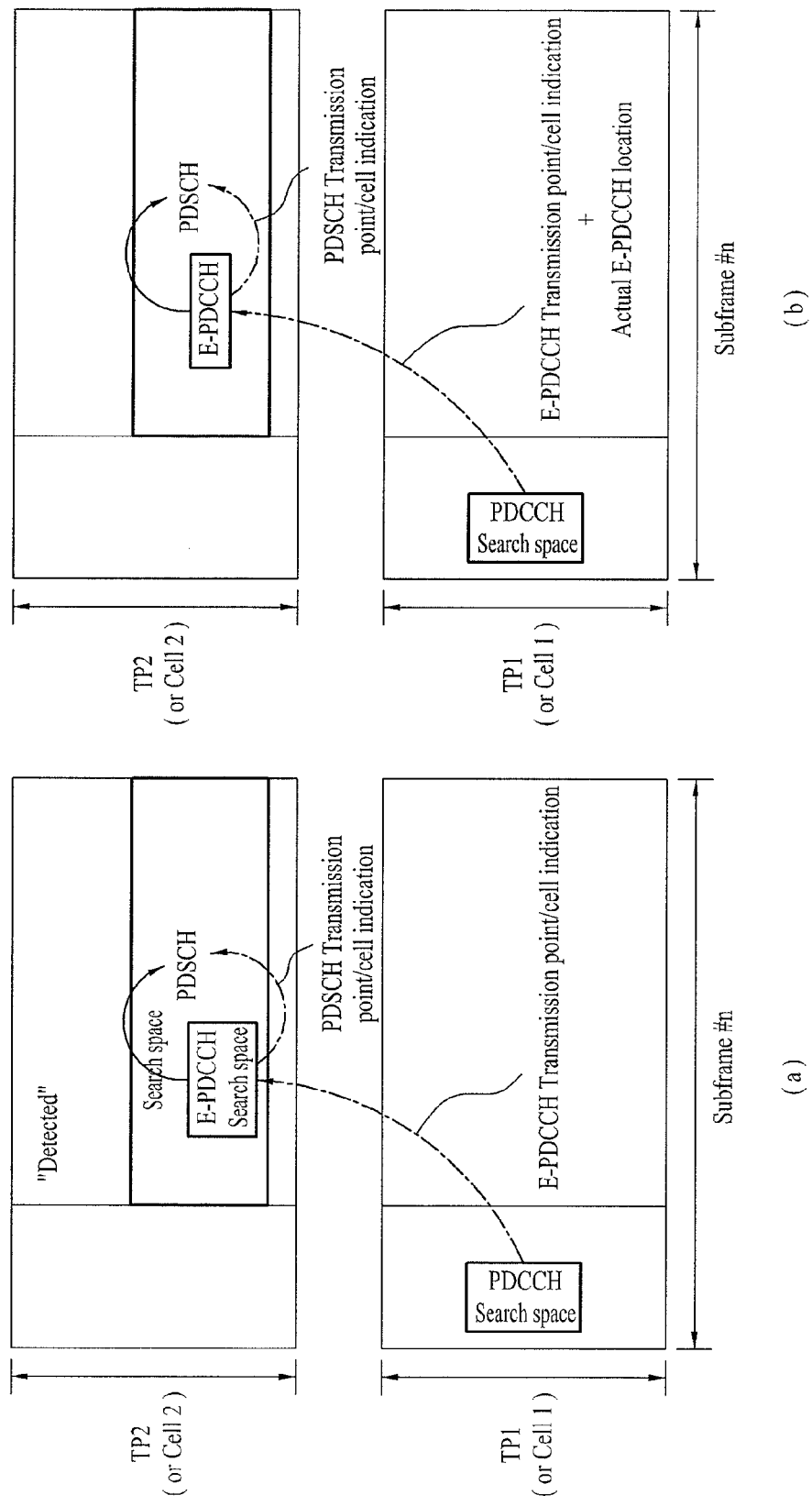
Figure 14:
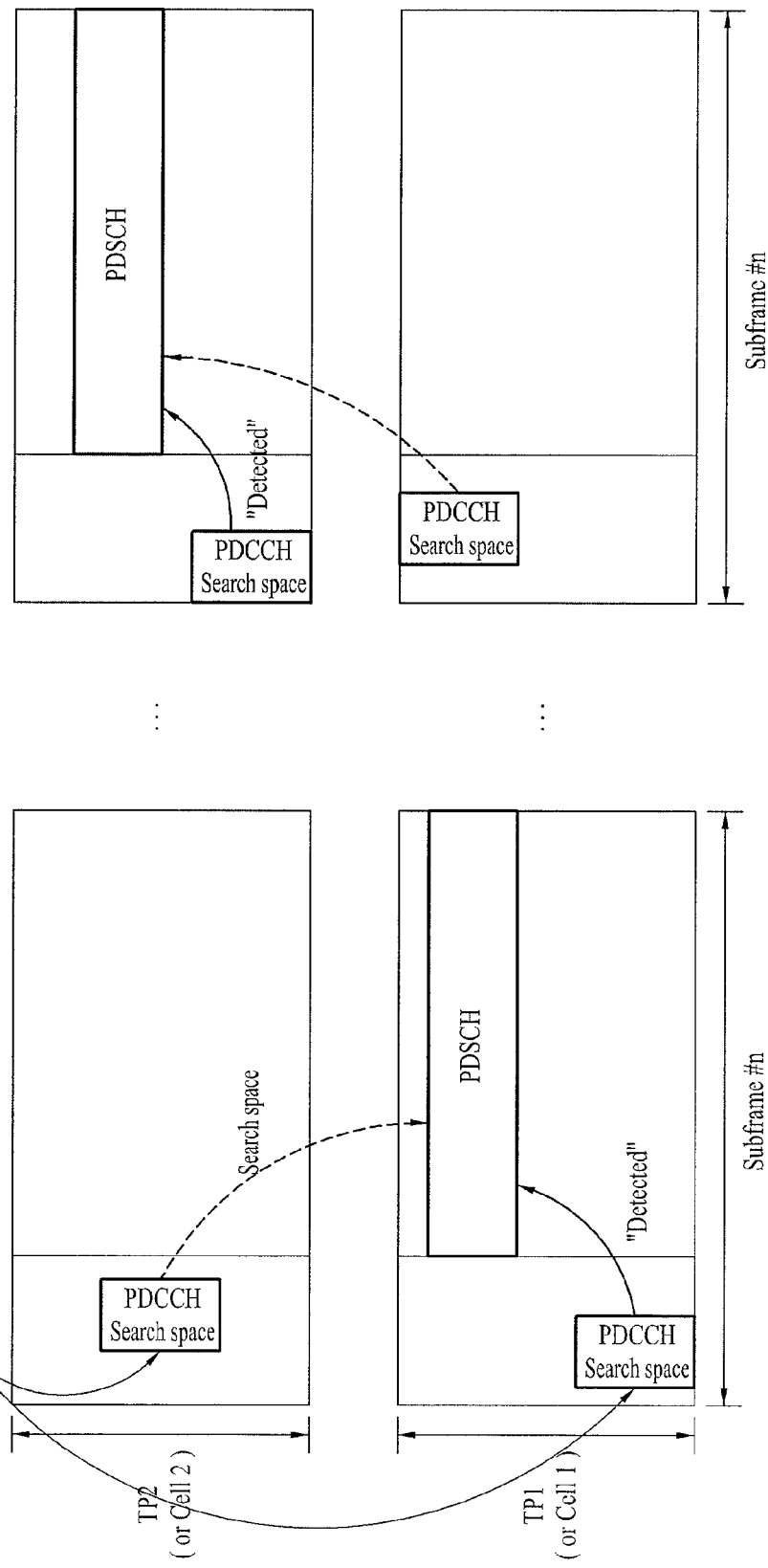
FIG. 14 is a diagram illustrating PDCCH transmission and PDSCH transmission linked thereto according to an embodiment of the present invention.

Subsequently, FIG. 13 shows the case in which information about the second transmission point for transmitting the subframe including the second search space is included in the first search space and the transmission point for transmitting the PDSCH is confirmed if the second search space is monitored.

As another method of determining the transmission point for transmitting the PDCCH, a previous subframe may indicate which transmission point transmits a currently transmitted subframe. As implementation of this method, a signaling bit may be added to a PDCCH of the previous subframe or redundant bits of a carrier indicator field/carrier indicator field may be used.

Figure 16:
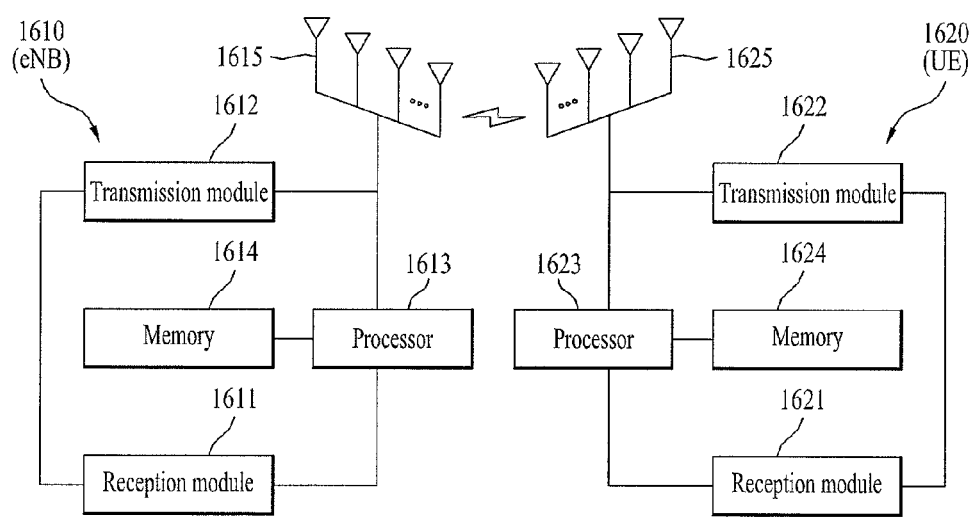
FIG. 16 is a diagram showing the configuration of a transmission point apparatus and a UE apparatus according to an embodiment of the present invention.

If the transmission point of the PDCCH is determined by the above-described methods, the transmission point of the PDSCH may be implicitly set such that the PDSCH is transmitted in a transmission point (or cell), in which a PDCCH/e-PDCCH is detected. Referring to FIG. 16, the PDCCH may be partitioned and transmitted by the first transmission point (TP1) and the second transmission point (TP2). The UE may estimate that the PDSCH is transmitted in subframe #n transmitted from the first transmission point, if the PDCCH is detected from the search space transmitted from the first transmission point. Information about which transmission point transmits PDSCH codewords may be indicated using an additional indicator and the additional indicator may be an independent bit field or a jointly coded bit.

Alternatively, the transmission point of the PDSCH may be linked to a scheduled downlink RB index. For example, a scrambling ID or a cell ID of a downlink transmission point may be determined according to on which RB transmission is performed, which will be described with reference to FIG. 17.

Figure 15:
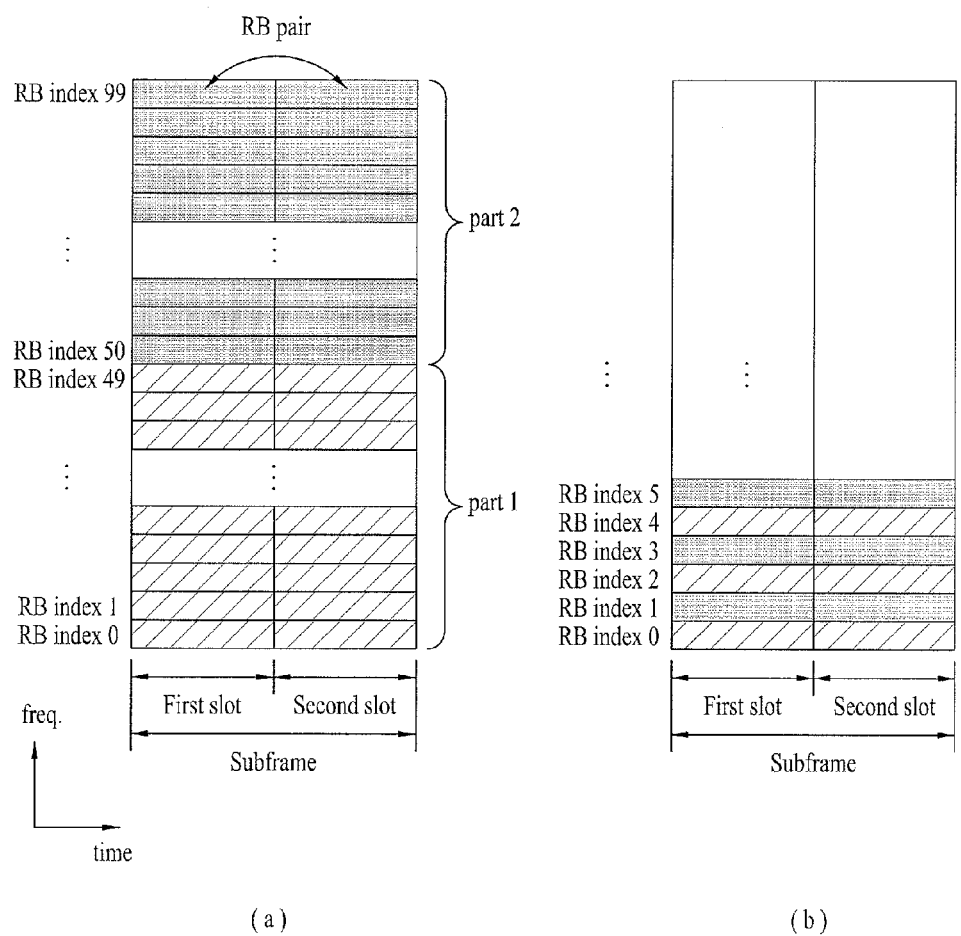
FIG. 15 is a diagram illustrating linkage between a transmission point and an RB index according to an embodiment of the present invention.

FIG. 15 is a diagram illustrating linkage between a transmission point and an RB index according to an embodiment of the present invention. In FIG. 15, assume that system bandwidth is 100 RBs and the number of transmission points is two. Referring to FIG. 15(a), downlink RBs are partitioned into two parts (part 1: RB indices 0 to 49, part 2: RB indices 50 to 99). If a PDSCH is scheduled to part 1, this indicates that a first scrambling code is used and a first transmission point performs transmission and, if a PDSCH is scheduled to part 2, this indicates that a second scrambling code is used and a second transmission point performs transmission. A reference point for partitioning the downlink RBs into two parts may be a lowest or highest index of a region to which the PDSCH is allocated or may be determined according to a predefined rule. In addition, if a cell ID is changed according to RB index, all transmission parameters related to the cell identifier may be changed and transmitted and a UE, which is designed to recognize the changed cell ID, may perform demodulation based on the cell ID related to a scheduled RB.

FIG. 15(b) shows the case in which an even numbered RB index is part 1 and an odd numbered RB index is part 2 as another example of partitioning downlink RBs, and a detailed description thereof is replaced by the description of FIG. 17(a).

The above-described method is applicable to a demodulation reference signal (DMRS) multiplexed with a PDSCH, such as an e-PDCCH. If a signal is divided and transmitted per antenna port or layer or if a plurality of layers is used even at the same RB location, a scrambling identifier may be determined according to the index of an RB region to which a codeword mapped to a layer is allocated. Accordingly, a non-overlapping part may be demodulated using one scrambling identifier and an overlapping part may be demodulated using a scrambling identifier suitable for each layer or codeword.

FIG. 16 is a diagram showing the configuration of a transmission point apparatus and a UE apparatus according to an embodiment of the present invention.

Referring to FIG. 16, the transmission point apparatus 1610 according to the present invention may include a reception module 1611, a transmission module 1612, a processor 1613, a memory 1614 and a plurality of antennas 1615. Since the plurality of antennas 1915 is used, the transmission point apparatus may support MIMO transmission/reception. The reception module 1615 may receive a variety of signals, data and information from the UE in uplink. The transmission module 1612 may transmit a variety of signals, data and information to the UE in downlink. The processor 1613 may control the overall operation of the transmission point apparatus 1610.

The processor 1613 of the transmission point apparatus 1610 according to one embodiment of the present invention receives a physical uplink control channel (PUCCH). The resource index for transmitting the PUCCH may correspond to a part corresponding to the transmission point among n parts of uplink bandwidth.

The processor 1613 of the transmission point apparatus 1610 may process information received by the transmission point apparatus 1610 and information to be transmitted to an external device and the memory 1614 may store the processed information for a predetermined time and may be replaced by a component such as a buffer (not shown).

Referring to FIG. 16, the UE apparatus 1620 according to the present invention may include a reception module 1621, a transmission module 1622, a processor 1623, a memory 1624 and a plurality of antennas 1625. Since the plurality of antennas 1925 is used, the UE apparatus may support MIMO transmission/reception. The reception module 1625 may receive a variety of signals, data and information from the BS in downlink. The transmission module 1622 may transmit a variety of signals, data and information to the BS in uplink. The processor 1623 may control the overall operation of the UE apparatus 1620.

The processor 1623 of the UE apparatus 1620 according to one embodiment of the present invention determines a resource index for transmitting a physical uplink control channel (PUCCH) and transmits the PUCCH to any one of a plurality of transmission points. The transmission point which will receive the PUCCH may be determined depending upon to which of n parts of uplink bandwidth the resource index belongs.

The processor 1623 of the UE apparatus 1620 may process information received by the UE apparatus 1620 and information to be transmitted to an external device and the memory 1914 may store the processed information for a predetermined 6 time and may be replaced by a component such as a buffer (not shown).

In the above-described detailed configuration of the transmission point apparatus and the UE apparatus, details of the above-described various embodiments of the present invention may be independently applied or 2 or more embodiments may be applied at the same time. In this case, overlapping details will be omitted from the description for simplicity and clarity.

Furthermore, in the description of FIG. 16, the description of the transmission point apparatus 1610 may also be equally applied to a device functioning as a downlink transmission subject or an uplink reception subject. The description of the UE apparatus 1620 may also be equally applied to a relay station device functioning as an uplink transmission subject or a downlink reception subject.

The embodiments of the present invention can be implemented by a variety of means, for example, hardware, firmware, software, or a combination thereof.

In the case of implementing the present invention by hardware, the present invention can be implemented with application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. Software code may be stored in a memory unit so as to be driven by a processor. The memory unit is located inside or outside of the processor, so that it can communicate with the aforementioned processor via a variety of well-known parts.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. Additionally, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with other claims referring to the other claims other than the specific claims to constitute the embodiment or add new claims by means of amendment after the application is filed.

INDUSTRIAL APPLICABILITY

Although an example of applying the present invention to a 3GPP LTE system has been described, the present invention is applicable to various mobile communication systems according to the same or uniform principles.

The invention claimed is:

1. A method of, at a user equipment (UE), receiving a signal from a plurality of transmission points in a wireless communication system, the method comprising:

performing blind decoding with respect to a first search space of a subframe received from a first transmission point; and performing blind decoding with respect to a second search space of a subframe received from a second transmission point, wherein a combination of the first search space and the second search space constitutes a whole search space, and wherein the first search space is located in a control region indicated by a physical control format indicator channel (PCFICH) and the second search space is located in a data region excluding the control region.

2. The method according to claim 1, wherein the first search space is for downlink control information (DCI) for a plurality of UEs including the UE and the second search space is DCI for the UE.

3. The method according to claim 1, wherein the first search space is for a DCI format which does not depend on a transmission mode and the second search space is for a DCI format which depends on a transmission mode.

4. The method according to claim 1, wherein the first search space and the second search space do not overlap in terms of an aggregate of control channel elements which is a blind decoding unit.

5. The method according to claim 1, wherein the number of physical downlink control channel (PDCCH) candidates included in the first search space is equal to the number of PDCCH candidates included in the second search space.

6. The method according to claim 1, wherein the first search space and the second search space are different in terms of the number of times of blind decoding.

7. The method according to claim 1, wherein the first search space and the second search space are located in a control region indicated by a physical control format indicator channel (PCFICH).

8. The method according to claim 1, wherein the second search space is indicated by downlink control information (DCI) acquired from the first search space.

9. The method according to claim 1, wherein the first transmission point and the second transmission point are determined by information fed back by the UE.

10. The method according to claim 1, further comprising transmitting channel state information of the first transmission point and channel state information of the second transmission point in channel state information of the plurality of transmission points.

11. A method of transmitting a signal at a first transmission point among a plurality of transmission points in a wireless communication system, the method comprising:

transmitting a subframe including a first search space, which corresponds to a subframe including a second search space transmitted by a second transmission point, wherein a combination of the first search space and the second search space constitutes a whole search space, and wherein the first search space is located in a control region indicated by a physical control format indicator channel (PCFICH) and the second search space is located in a data region excluding the control region.

12. A user equipment (UE) apparatus for receiving a signal from a plurality of transmission points in a wireless communication system, the UE apparatus comprising:

a reception module; and a processor, wherein the processor is configured to perform blind decoding with respect to a first search space of a subframe received from a first transmission point and a second search space of a subframe received from a second transmission point, and a combination of the first search space and the second search space constitutes a whole search space, and wherein the first search space is located in a control region indicated by a physical control format indicator channel (PCFICH) and the second search space is located in a data region excluding the control region.

13. An apparatus of a first transmission point among a plurality of transmission points in a wireless communication system, the apparatus comprising:

a transmission module; and a processor, wherein the processor transmits a subframe including a first search space, which corresponds to a subframe including a second search space transmitted by a second transmission point, and a combination of the first search space and the second search space constitutes a whole search space, and wherein the first search space is located in a control region indicated by a physical control format indicator channel (PCFICH) and the second search space is located in a data region excluding the control region.

14. The method according to claim 1, wherein PDCCH is detected in the first search space and Enhanced-PDCCH is detected in the second search space.

* * * * *